United States Patent [19]

Ogawa

[11] Patent Number: 5,640,241
[45] Date of Patent: Jun. 17, 1997

[54] LIGHT SPOT POSITION MEASURING METHOD OF DETECTING ONE-DIMENSIONAL POSITION BY TWO-DIMENSIONAL SENSOR

[75] Inventor: Yasuji Ogawa, Otone, Japan

[73] Assignee: Kabushikikaisha Wacom, Japan

[21] Appl. No.: 392,375

[22] Filed: Feb. 21, 1995

[30] Foreign Application Priority Data

Feb. 23, 1994 [JP] Japan .................................. 6-051399

[51] Int. Cl.$^6$ .................................................. G01B 11/26
[52] U.S. Cl. ............................................ 356/375; 356/141.5
[58] Field of Search ................................. 356/372, 375, 356/376, 218, 121–123, 141.5, 141.4; 250/559.29

[56] References Cited

U.S. PATENT DOCUMENTS

| | | | |
|---|---|---|---|
| 4,207,002 | 6/1980 | Gara et al. | 356/375 |
| 4,595,294 | 6/1986 | Ohki et al. | 356/375 |
| 4,630,909 | 12/1986 | Forker et al. | 356/121 |
| 4,710,028 | 12/1987 | Grenier et al. | 356/375 |
| 4,881,809 | 11/1989 | Thierry | 356/5 |
| 5,194,919 | 3/1993 | Katayama | 356/375 |
| 5,196,900 | 3/1993 | Pettersen | 356/375 |

FOREIGN PATENT DOCUMENTS

| | | | |
|---|---|---|---|
| 0095308 | 5/1985 | Japan | 356/375 |
| 0069903 | 3/1989 | Japan | 356/375 |
| 3-31362 | 5/1991 | Japan . | |

OTHER PUBLICATIONS

"Position Detection of An Extended Light Spot", IBM Technical Disclosure Bulletin, vol. 15, No. 12, May 1973, pp. 3791–3792, Korth et al.

*Primary Examiner*—Hoa Q. Pham
*Attorney, Agent, or Firm*—Adams & Wilks

[57] ABSTRACT

A light spot position measuring method uses an optical converter such as a cylindrical lens, a two-dimensional image pickup device such as a CCD image sensor and an image processing or computing unit. The cylindrical lens converts a light spot to a linear image intersecting a reference axis direction. The image sensor captures the linear image and produces corresponding pixel data. The computing unit processes the pixel data and derives a position of the light spot along the reference axis direction. In the light spot position measuring method, an orthogonal coordinate system is first set relative to a pixel array of the image sensor. The coordinate system has main and auxiliary axes orthogonal to each other. Subsequently, the linear image is projected to be inclined relative to the coordinate system with an angle of the linear image relative to the auxiliary axis smaller than that relative to the main axis. Subsequently, the pixel data is processed to effect linear-approximation of the linear image to derive a corresponding straight line. Further, another one-dimensional position of the straight line in a direction of the main axis is detected in terms of a one-dimensional position in a direction of the auxiliary axis by a magnified scale. Finally, the position of the light spot is derived based on a result of the detection of the one-dimensional position of the straight line. This measuring method may also be applied to derivation of a two-dimensional position of the light spot.

23 Claims, 8 Drawing Sheets

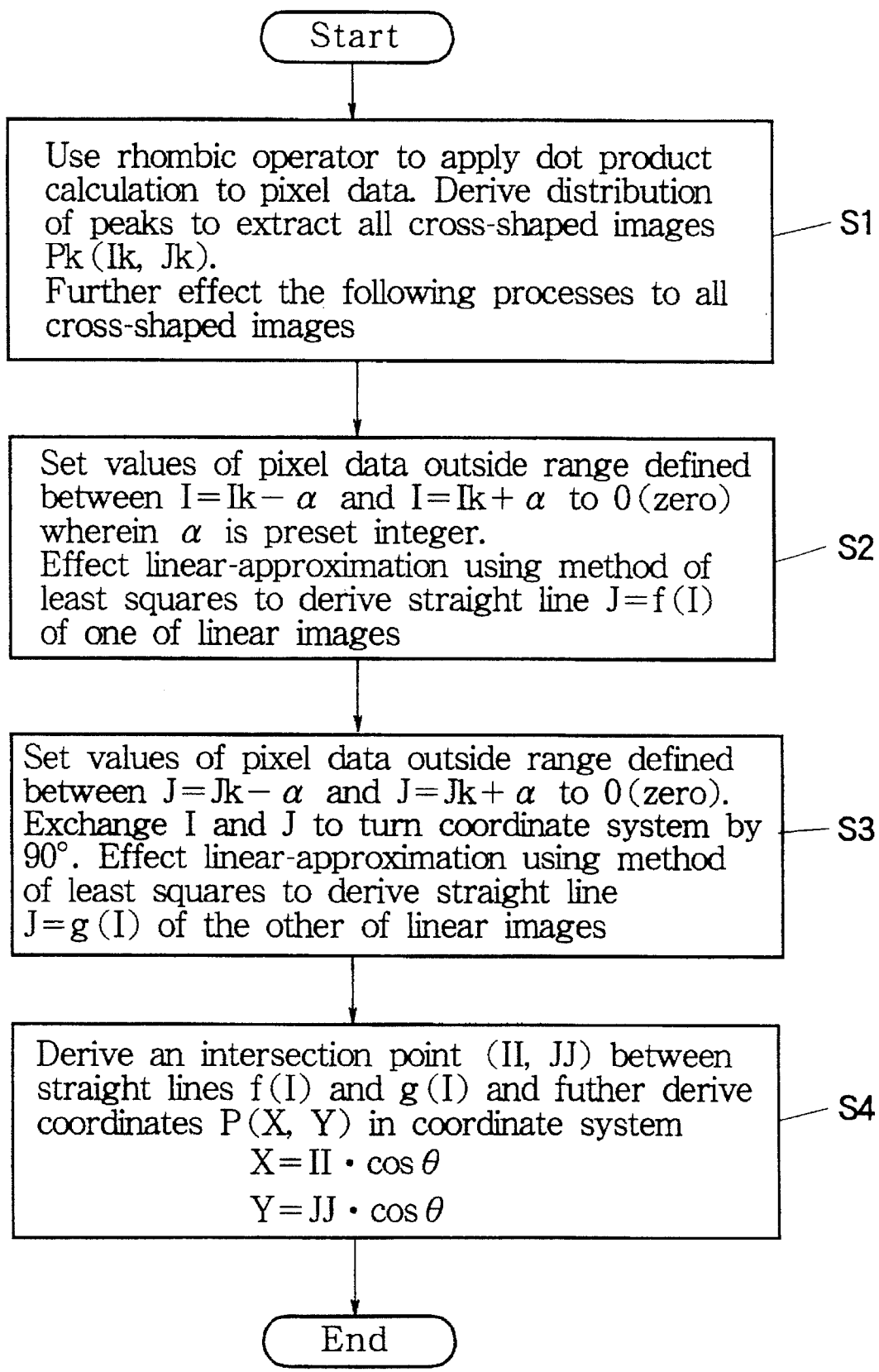

Start
↓
S1: Use rhombic operator to apply dot product calculation to pixel data. Derive distribution of peaks to extract all cross-shaped images $P_k(I_k, J_k)$.
Further effect the following processes to all cross-shaped images

↓

S2: Set values of pixel data outside range defined between $I = I_k - \alpha$ and $I = I_k + \alpha$ to 0 (zero) wherein $\alpha$ is preset integer.
Effect linear-approximation using method of least squares to derive straight line $J = f(I)$ of one of linear images

↓

S3: Set values of pixel data outside range defined between $J = J_k - \alpha$ and $J = J_k + \alpha$ to 0 (zero). Exchange $I$ and $J$ to turn coordinate system by 90°. Effect linear-approximation using method of least squares to derive straight line $J = g(I)$ of the other of linear images

↓

S4: Derive an intersection point $(II, JJ)$ between straight lines $f(I)$ and $g(I)$ and futher derive coordinates $P(X, Y)$ in coordinate system
$$X = II \cdot \cos\theta$$
$$Y = JJ \cdot \cos\theta$$

↓
End

LIGHT SPOT POSITION MEASURING METHOD OF DETECTING ONE-DIMENSIONAL POSITION BY TWO-DIMENSIONAL SENSOR

BACKGROUND OF THE INVENTION

1. Field of the Invention

The present invention relates to a light spot position measuring method, wherein a position or positions of a point light source or point light sources which directly or indirectly emits/emit light is/are measured using a two-dimensional image pickup device. More specifically, the present invention relates to a technique for measuring the position or positions of the point light source or sources with improved accuracy.

2. Description of the Prior Art

Conventionally, when detecting a two-dimensional position of an observation point identified by a point light source on a plane, for example, two beam-direction detectors each formed by combining a one-dimensional image pickup device, such as, a linear image sensor and a slit or a lens, are used to derive a position of the point light source (hereinafter also referred to as "light spot position") using the method of triangulation. For increasing the measurement accuracy to a practical level in such a light spot position measurement, it is necessary to improve the resolution of the linear image sensor. At present, a commercially available linear image sensor has about 10,000 picture elements (pixels) at the maximum. In order to ensure the measurement accuracy of the practical level in, such as, the survey in the civil engineering field, an ultrahigh-density one-dimensional image pickup device having about 100,000 pixels is required.

On the other hand, when detecting a three-dimensional position of a target in the form of a point light source, the so-called stereo method has been widely used, wherein two television cameras each including a two-dimensional image pickup device, such as, an area image sensor are used. In this case, improvement in the measurement accuracy faces further difficulty since, for improving the resolution of the area image sensor, the number of pixels is required to be increased in a square rate.

Technique has been proposed as disclosed in, such as, Japanese Second (examined) Patent Publication No. 3-31362, for improving an apparent or effective resolution of the television camera without actually increasing the number of the pixels of the area image sensor. According to this technique, a cross filter is mounted to a lens of the television camera so as to convert a light beam from a point light source into a cross-shaped streak image through the cross filter. The cross-shaped streak image is projected onto a pixel array of the area image sensor. The projected image is processed to derive an intersection point of two straight lines included in the cross-shaped streak image for determining a position of the point light source.

SUMMARY OF THE INVENTION

A basic principle in the foregoing conventional light spot position measuring methods is that a one-dimensional position is detected by a one-dimensional image pickup device, such as, a linear image sensor, and a two-dimensional position is detected by a two-dimensional image pickup device, such as, an area image sensor. However, in such an arrangement, improving the resolution of the image pickup device is the only way to enhance the measurement accuracy, while there is an inevitable limit in increasing the number of pixels. Even if the high image processing technique is used to raise the detection accuracy, an apparent resolution is about 1/10 times a pixel pitch at most.

In view of this, it is an object of the present invention to enable a measurement of a position of a light spot in a one-dimensional direction with high accuracy, using a two-dimensional image pickup device in place of a one-dimensional image pickup device. It is another object of the present invention that, when measuring a two-dimensional position of a light spot, a light from the light spot is resolved in different one-dimensional directions orthogonal to each other to form orthogonal linear images, and a two-dimensional image pickup device is effectively applied to the respective linear images so as to significantly improve the measurement accuracy. It is still another object of the present invention to provide a method of converting a light spot into an ideal linear image to ensure an effective detection of a position of the light spot in a one-dimensional direction using a two-dimensional image pickup device.

A light spot position measuring method according to the present invention uses an optical converter, a two-dimensional image pickup device, and an image processing unit. Basically, a light spot as an object to be measured is first converted into a linear image intersecting a given one-dimensional direction, using the optical converter. Subsequently, the linear image is captured and corresponding pixel data are produced, using the two-dimensional image pickup device having a pixel array. Finally, the pixel data are processed to derive a position of the light spot along the given one-dimensional direction, using the image processing unit. The light spot position measuring method is characterized by performing the following steps:

First, a setting step is executed to set an orthogonal coordinate system relative to the pixel array. The orthogonal coordinate system has main and auxiliary axes orthogonal to each other. Subsequently a projecting step is executed to project the linear image so as to be inclined relative to the orthogonal coordinate system such that an angle of the linear image relative to the auxiliary axis is set smaller than that relative to the main axis. Subsequently, a detecting step is executed to process the pixel data so as to effect linear-approximation of the linear image to derive a corresponding straight line. The detecting step detects a one-dimensional position of the straight line in a direction of the main axis in terms of another one-dimensional position in a direction of the auxiliary axis by a magnified scale in an enlarged manner. Finally, a deriving step is executed to derive the position of the light spot based on a result of the magnified or enlarged detection.

Preferably, the projecting step projects the linear image with the angle to the auxiliary axis which is in a range between greater than 0° and not greater than 25°. The projecting step may project the linear image using an optical converter having a cylindrical lens surface. Alternatively, the linear image may be projected using an optical converter having a slit. On the other hand, the deriving step may preferably derive a one-dimensional position of the light spot along the main axis based on the enlarged detection result. Alternatively, the deriving step may derive the one-dimensional position of the light spot along a given reference axis correlated the main axis based on the enlarged detection result.

The foregoing light spot position measuring method may be applied not only to the one-dimensional measurement, but also to the two-dimensional measurement. In this case, a setting step first sets an orthogonal coordinate system so as to match a desired matrix arrangement or a lattice which the pixel array has. Subsequently, a projecting step projects a pair of orthogonal linear images (a cross-shaped image) so as to be inclined relative to the orthogonal coordinate system at an angle deviating from 45°. Subsequently, a deriving step processes the pixel data to effect linear-approximation of one of the orthogonal linear images which has an inclination greater than 45° relative to the orthogonal coordinate system. The deriving step further effects linear-approximation of the other of the orthogonal linear images which has an inclination greater than 45° relative to another orthogonal coordinate system derived by turning the original orthogonal coordinate system by 90°. Finally, the deriving step derives the two-dimensional position of the light spot based on results of the linear-approximations. The two-dimensional position of the light spot corresponds to an intersection of the orthogonal linear images.

The projecting step may project the orthogonal linear images using an optical converter having divided cylindrical lens surfaces. The cylindrical lens surfaces have their cylinder axes which are orthogonal to each other. Alternatively, the orthogonal linear images may be projected using an optical converter having slits orthogonal to each other.

According to the present invention, the light spot is converted into the linear image and projected onto the pixel array of the two-dimensional image pickup device as being inclined thereto. The inclination of the linear image relative to the main axis may be set equal to or greater than 65°, while the inclination relative to the auxiliary axis may be set equal to or less than 25°. With this arrangement, a displacement of the light spot in the main axis direction causes a magnified or enlarged displacement of the light spot in the auxiliary axis direction which is more than double the displacement in the main axis direction. This is based on the vernier principle. The main axis may correspond to the vernier main scale and the auxiliary axis may correspond to the vernier auxiliary scale. By optimizing the projecting inclination angle of the linear image relative to the orthogonal coordinate system matching the matrix arrangement of the pixel array, a great number of the pixels included in the pixel array can be efficiently utilized. In principle, the resolution of the one-dimensional position detection can be enhanced to such an extent as to correspond to the total number of the pixels included in the two-dimensional image pickup device. For example, by using an area image sensor having 500×500 pixels, it is possible to realize the one-dimensional position detection effectively with the resolution of a linear image sensor having 250,000 pixels. This allows the precise position measurement, particularly, in the survey of the civil engineering field where extremely high measurement accuracy is required. Further, by converting the light spot into the orthogonal two linear images and projecting them onto the pixel array with a given inclination angle, even in the two-dimensional position detection, the position detection resolution for each of the linear images can be enhanced to such an extent as to correspond to the total number of the pixels included in the two-dimensional image pickup device. By using the optical converter having the two-piece cylindrical lens surfaces for effecting the foregoing conversion and projection, the significantly sharp linear images can be formed so as to extend merit of the light spot position measuring method according to the present invention to the maximum extent. Alternatively, by using the slit plate formed with a pair of slits orthogonal to each other, spherical aberration can be eliminated and further, cost of components can be reduced.

BRIEF DESCRIPTION OF THE DRAWINGS

The present invention will be understood more fully from the detailed description given hereinbelow and from the accompanying drawings of the preferred embodiments of the invention, which are given by way of example only, and are not intended to limit the present invention.

In the drawings:

FIG. 11 is a flowchart showing a detailed procedure of the light spot position measuring method according to the third preferred embodiment;

DESCRIPTION OF THE PREFERRED EMBODIMENTS

Now, preferred embodiments of the present invention will be described in detail hereinbelow with reference to the accompanying drawings.

Figure 1:
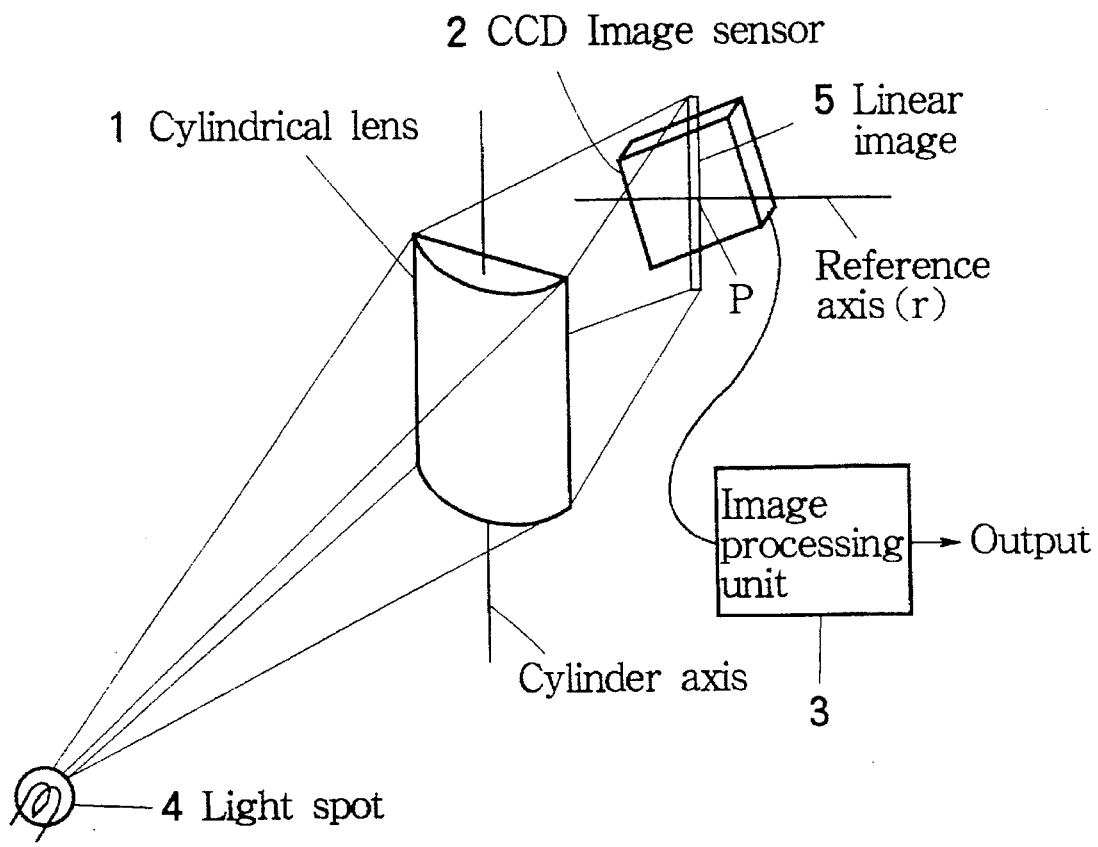
FIG. 1 is a diagram for explaining a light spot position measuring method according to a first preferred embodiment of the present invention.

FIG. 1 is a diagram schematically showing a basic structure of a measuring apparatus used for effecting a light spot position measuring method according to a first preferred embodiment of the present invention. As shown in FIG. 1, the light spot position measuring method uses an optical converter in the form of a cylindrical lens 1, a two-dimensional image pickup device in the form of a CCD image sensor 2 having a pixel array, and an image processing or computing unit 3 including a computer. The cylindrical lens 1 converts a light spot 4 as an object to be measured into a linear image 5 which intersects a reference axis r in a predetermined one-dimensional direction. The CCD image sensor 2 captures the linear image 5 and produces corresponding pixel data. The image processing unit 3 processes the pixel data and derives a position of the light spot 4 along the predetermined one-dimensional direction (hereinafter also referred to as "one-dimensional position"). In this preferred embodiment, the cylindrical lens 1 has a vertical cylinder axis so that the linear image 5 is projected onto the pixel array of the CCD image sensor 2 in a vertical direction. On the other hand, the light spot 4 is also displaceable in a horizontal direction and the reference axis (r) is shown correspondingly. As will be appreciated from the relationship shown in FIG. 1, an intersection point P between the linear image 5 and the reference axis (r) represents the one-dimensional position of the light spot 4. The linear image 5 is arranged so as to be inclined relative to the pixel array of the CCD image sensor 2.

Figure 2:
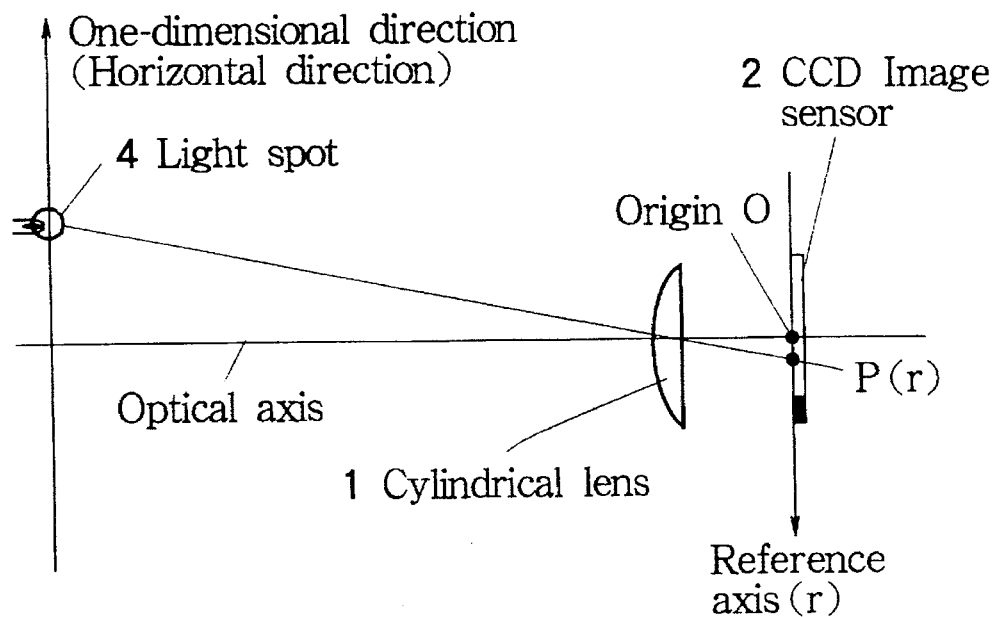
FIG. 2 is a diagram showing a geometrical arrangement of the optical structure shown in FIG. 1.

FIG. 2 is a diagram showing a geometrical relationship of the optical structure shown in FIG. 1. As described above, the light spot 4 is displaceable in the given one-dimensional direction (in the horizontal direction in this preferred embodiment). The reference axis (r) is set parallel to this given one-dimensional direction. An intersection point between an optical axis of the cylindrical lens 1 and the reference axis (r) is set as the origin O. An intersection point P(r) between the linear image 5 and the reference axis (r) represents the one-dimensional position of the light spot 4.

Figure 3:
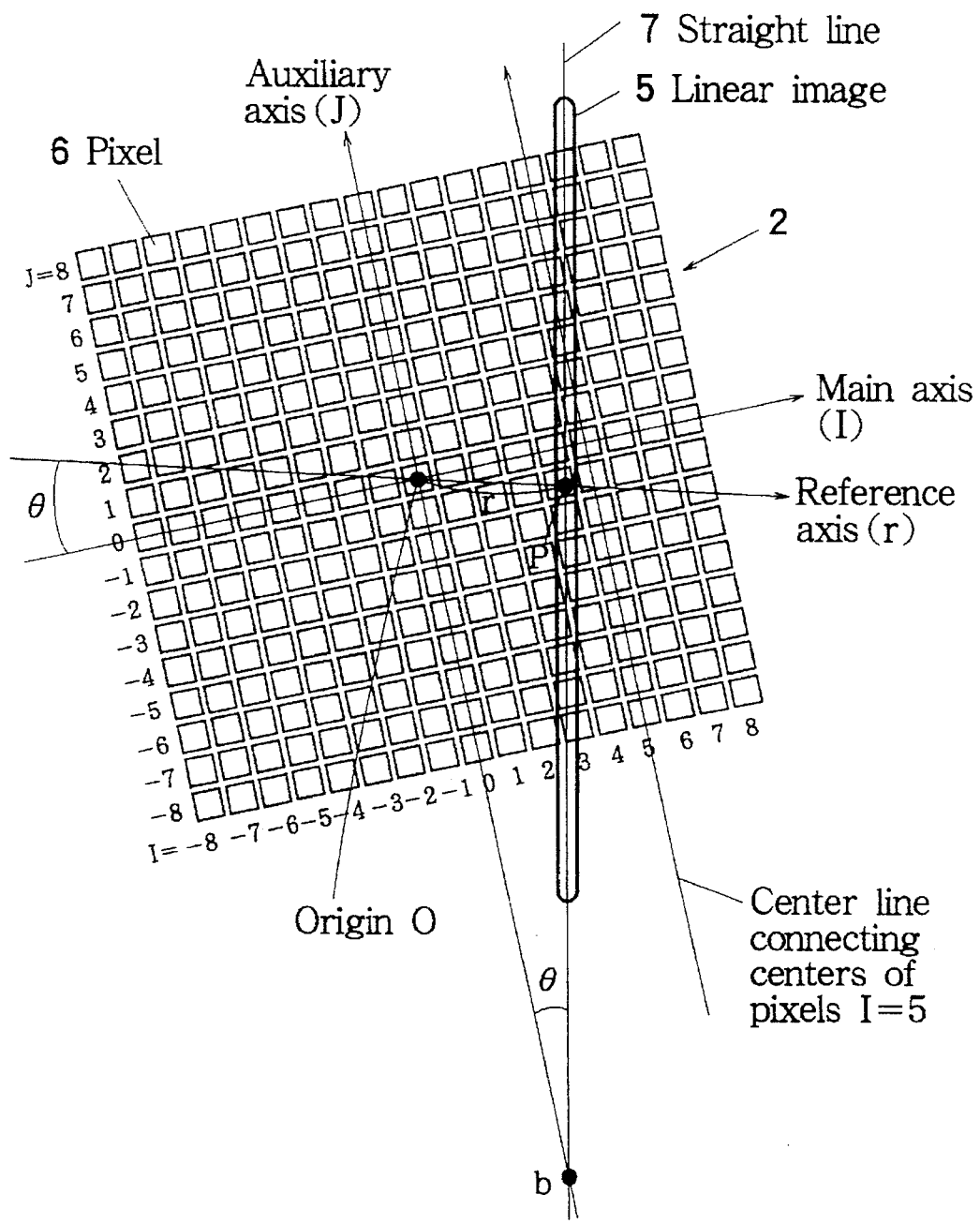
FIG. 3 is an enlarged plan view of a CCD image sensor shown in FIG. 1.

FIG. 3 is an enlarged plan view of the CCD image sensor shown in FIGS. 1 and 2. As shown in FIG. 3, the CCD image sensor 2 has a number of pixels 6 arranged in matrix or lattice so that a matrix array of the pixels 6 is formed. The linear image 5 is projected onto the matrix array of the pixels 6. Now, a basic procedure of the light spot position measuring method according to this preferred embodiment will be described hereinbelow with reference to FIG. 3. First, an orthogonal coordinate system having a main axis (I) and an auxiliary axis (J) orthogonal to each other is set relative to the matrix array of the pixels 6. In this preferred embodiment, a row direction of the matrix array coincides with the main axis (I), while a column direction of the matrix array coincides with the auxiliary axis (J). Further, the origin of the orthogonal coordinate system coincides with the origin O defined in FIG. 2. Subsequently, the linear image 5 is projected so as to be inclined relative to the orthogonal coordinate system such that an angle θ relative to the auxiliary axis (J) is made smaller than another angle relative to the main axis (I). In practice, the CCD image sensor 2 is arranged so as to be inclined relative to the reference axis (r) by the angle θ. Subsequently, the pixel data outputted from the CCD image sensor 2 are processed to effect linear approximation of the linear image 5 so as to derive a straight line 7 (hereinafter, center line). As appreciated from FIG. 3, a one-dimensional position of the center line 7 in a direction of the main axis (I) (that is, an intercept between the center line 7 and the main axis (I)) can be detected in an expanded or enlarged manner in terms of another one-dimensional position of the center line 7 in a direction of the auxiliary axis (J) (that is, an intercept between the center line 7 and the auxiliary axis (J)). Finally, the position P(r) of the light spot 4 is derived based on a result of the enlarged detection.

Figure 4:
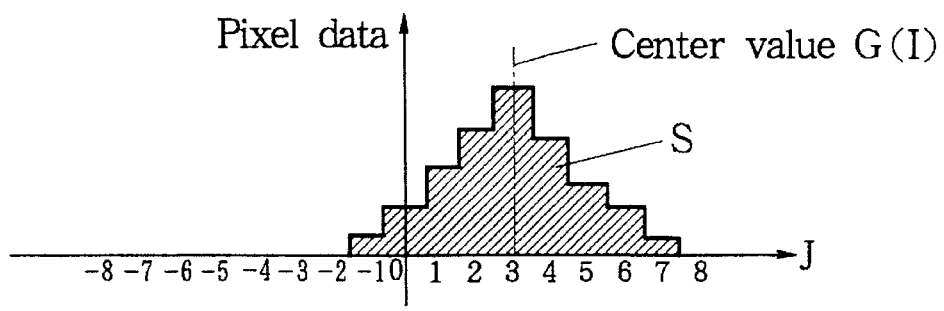
FIG. 4 is a diagram for explaining linear-approximation of a linear image projected onto a matrix array of pixels of the CCD image sensor shown in FIG. 3.

FIG. 4 is a diagram for explaining the foregoing linear-approximation of the linear image 5. FIG. 4 shows a distribution of the pixel data in a particular column (I=5 in this example) of the matrix array, wherein an axis of abscissas represents a row number. As appreciated from FIG. 3, the linear image 5 intersects the pixel column I=5 in the first quadrant of the orthogonal coordinate system. Corresponding to this, the distribution of the pixel data has a peak in a row J=3. In this preferred embodiment, an area S defined by a distribution curve of the pixel data is derived, and further, a center value G(I) thereof is derived in the order of sub-pixel. The center value G(I) estimates an intersection point between a center line of the pixel column I=5 and the center line 7 of the linear image 5. The calculation of the center is effected to all of the columns so as to derive the center line 7 statistically.

Figure 5:
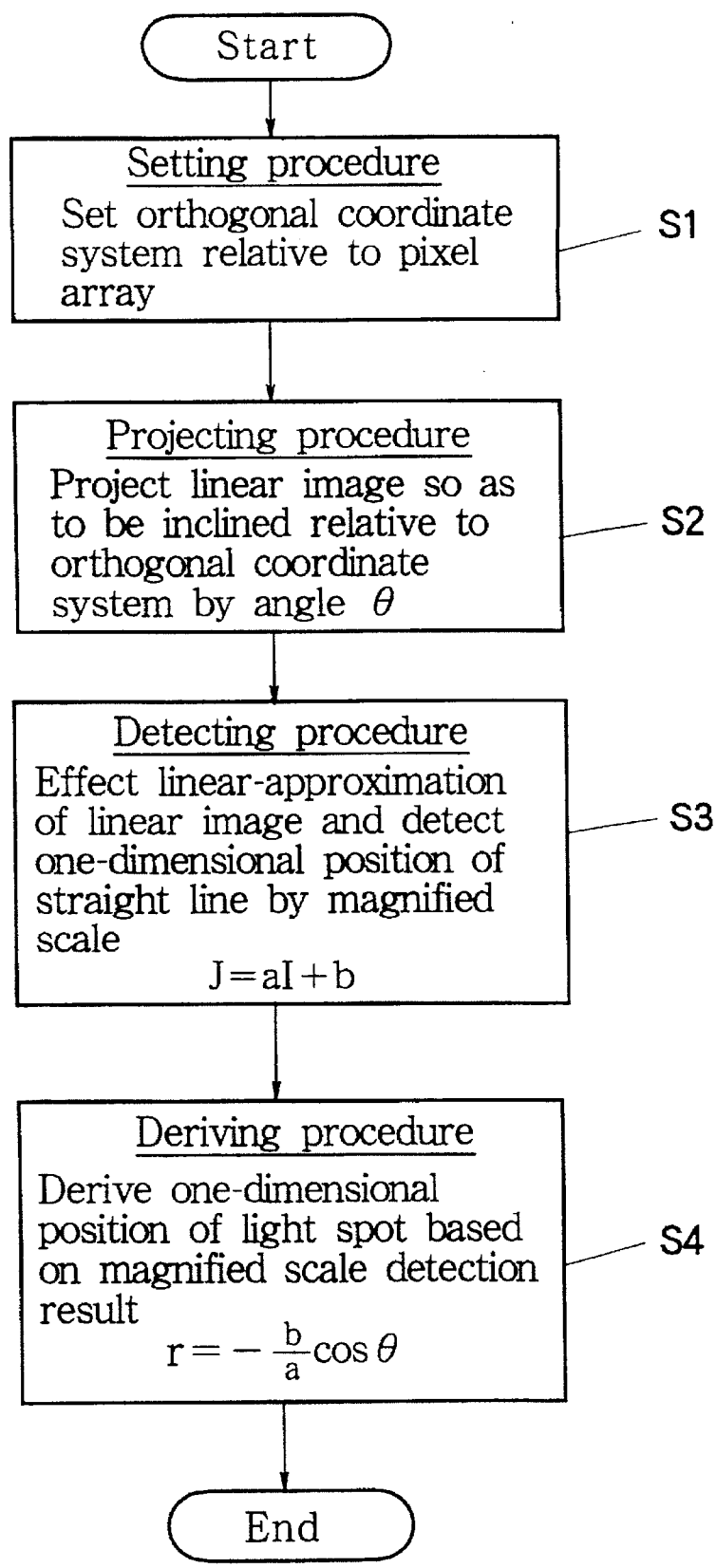
FIG. 5 is a flowchart showing a detailed procedure of the light spot position measuring method according to the first preferred embodiment.

With reference to a flowchart shown in FIG. 5, the procedure of the light spot position measuring method according to this preferred embodiment will be described in detail. First, in the setting procedure at step S1, the orthogonal coordinate system (I, J) is set relative to the matrix array of the pixels 6 as shown in FIG. 3. Subsequently, in the projecting procedure at step S2, the linear image 5 is projected so as to be inclined relative to the orthogonal coordinate system (I, J) by the angle θ. Subsequently, in the detecting procedure at step S3, the linear-approximation of the linear image 5 is effected to derive the center line 7. Specifically, as shown in FIG. 4, the center value G(I) is derived for each of all the pixel columns represented by I=−8, −7, −6, . . . , +8. Further, a linear function J=aI+b in the orthogonal coordinate system (I, J) is derived using the method of least squares. In this linear function, a represents a slope and b represents an intercept relative to the auxiliary axis (J) as shown in FIG. 3. As will be appreciated from FIG. 3, a one-dimensional position of the center line 7 in the direction of the main axis (I) is detected in terms of a value of the intercept b in an enlarged manner by a magnified scale. Finally, in the deriving procedure at step S4, a one-dimensional position of the light spot is derived based on the enlarged detection result. As appreciated from the geometrical relationship shown in FIG. 3, the light spot is given as the intersection point P between the center line 7 and the reference axis (r). Specifically, the intersection point P is given by r=(b/a)cosθ, wherein b/a represents a value of I when J=0 in the linear function J=aI+b.

The slope a of the center line 7 is given by 1/tanθ=cosθ/sinθ. When this relationship is put in the equation r=(b/a)cosθ, r=bsinθ is obtained. This means that a value of the intercept b, that is, a displacement in the direction of the auxiliary axis, is magnified by 1/sinθ relative to a value of r, that is, a displacement in the direction of the reference axis. Particularly, when about 25° is selected as the inclination angle θ, an enlargement ratio or magnification scale becomes about double. Further, as the angle θ approaches 0°, the enlargement ratio increases largely. Accordingly, it is preferable that the center line 7 or the linear image 5 is inclined relative to the auxiliary axis by an angle in a range between greater than 0° and equal to or less that 25°. As appreciated, the linear image 5 is inclined relative to the main axis by an angle in a range of 90°−θ.

Figure 6:
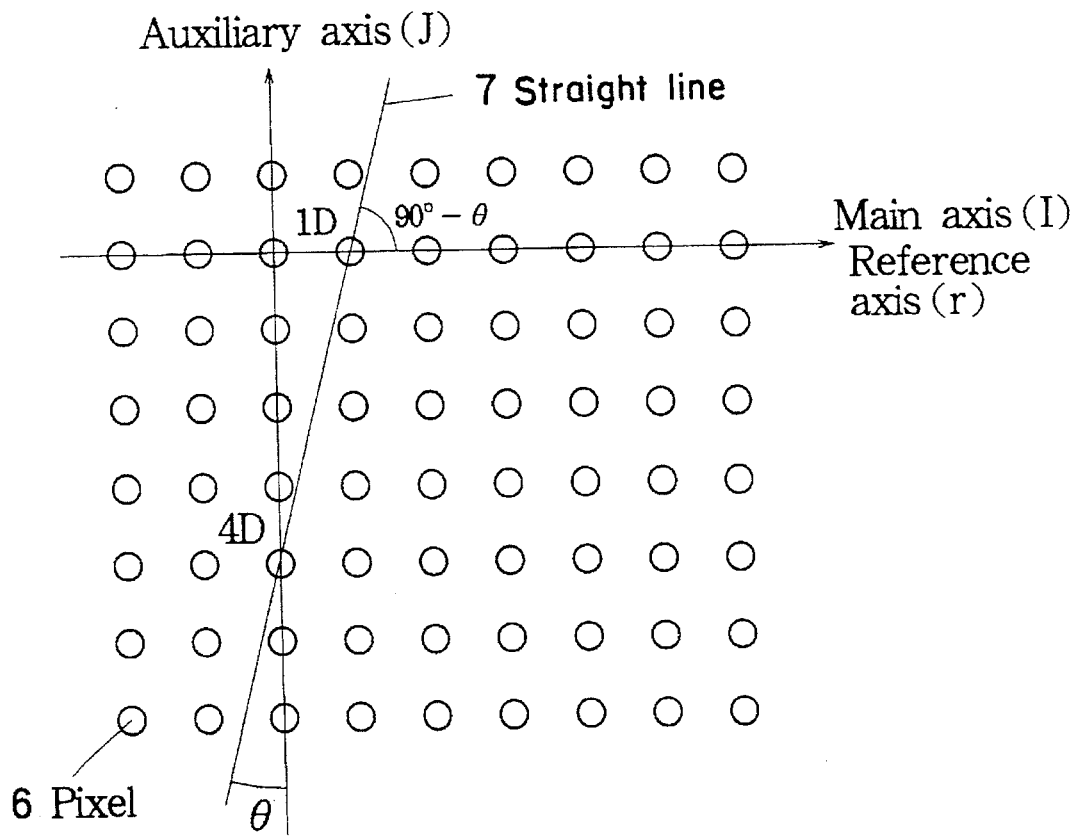
FIG. 6 is a diagram for explaining a light spot position measuring method according to a second preferred embodiment of the present invention.

FIG. 6 is a diagram for explaining a light spot position measuring method according to a second preferred embodiment of the present invention. As shown in FIG. 6, in this preferred embodiment, the main axis (I) and the reference axis (r) coincide with each other. Specifically, when the light spot displaces along the horizontal reference axis (r), the main axis (I) is also set horizontal while the auxiliary axis (J) is set vertical. Still in this case, the linear image 5 is projected such that the center line 7 of the linear image 5 is inclined relative to the auxiliary axis (J) by the given angle θ. In practice, for example, the cylinder axis of the cylindrical lens 1 may be set inclined relative to the vertical direction by θ in the structure of FIG. 1. In this preferred embodiment, a one-pitch displacement 1D in the direction of the main axis (I) is enlarged or expanded to a four-pitch displacement 4D in the direction of the auxiliary axis (J). In other words, the displacement in the direction of the main axis can be interpolated by the displacement in the direction of the auxiliary axis per quartered unit. As a value of θ is decreased, an enlargement ratio is increased so that the measurement accuracy of the position in the direction of the main axis (the position in the direction of the reference axis) is enhanced.

As will be readily appreciated, in the foregoing preferred embodiments, the light spot is converted into the linear image which is received by the two-dimensional image pickup device so as to efficiently utilize the pixel data. This arrangement significantly improves the measurement accuracy. The foregoing light spot measuring method may be understood more easily by considering the main axis as the vernier main scale and the auxiliary axis as the vernier auxiliary scale.

Figure 7:
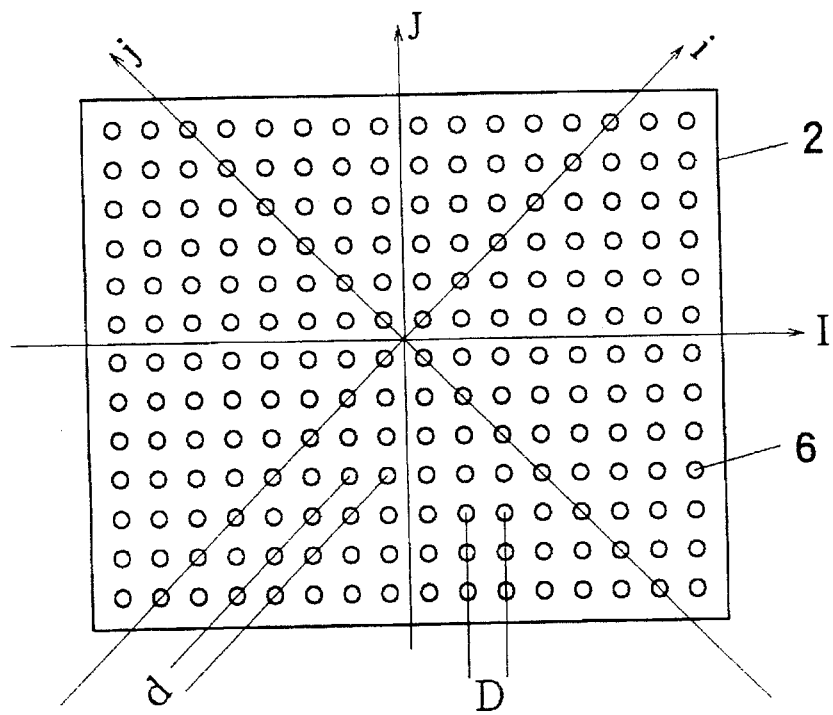
FIG. 7 is a diagram for explaining a method of assigning an orthogonal coordinate system to a CCD image sensor.

FIG. 7 is a diagram for explaining a method of setting the orthogonal coordinate system relative to the pixel array. As appreciated from FIG. 7, the assignment of the orthogonal coordinate system is not necessarily unique. Basically, the orthogonal coordinate system may be set so as to match a desired one of matrix directions (lattice directions) which the matrix array of the pixels 6 has. In FIG. 7, two kinds of the orthogonal coordinate systems (I, J) and (i, j) are shown. When the orthogonal coordinate system (I, J) is assigned to the matrix array of the pixels 6, a pixel pitch D is given. On the other hand, when the orthogonal coordinate system (i, j) is assigned, a pixel pitch d is given. Since the pixel pitch d is smaller than the pixel pitch D, the resolution of the CCD image sensor is improved when the orthogonal coordinate system (i, j) is assigned.

Figure 8:
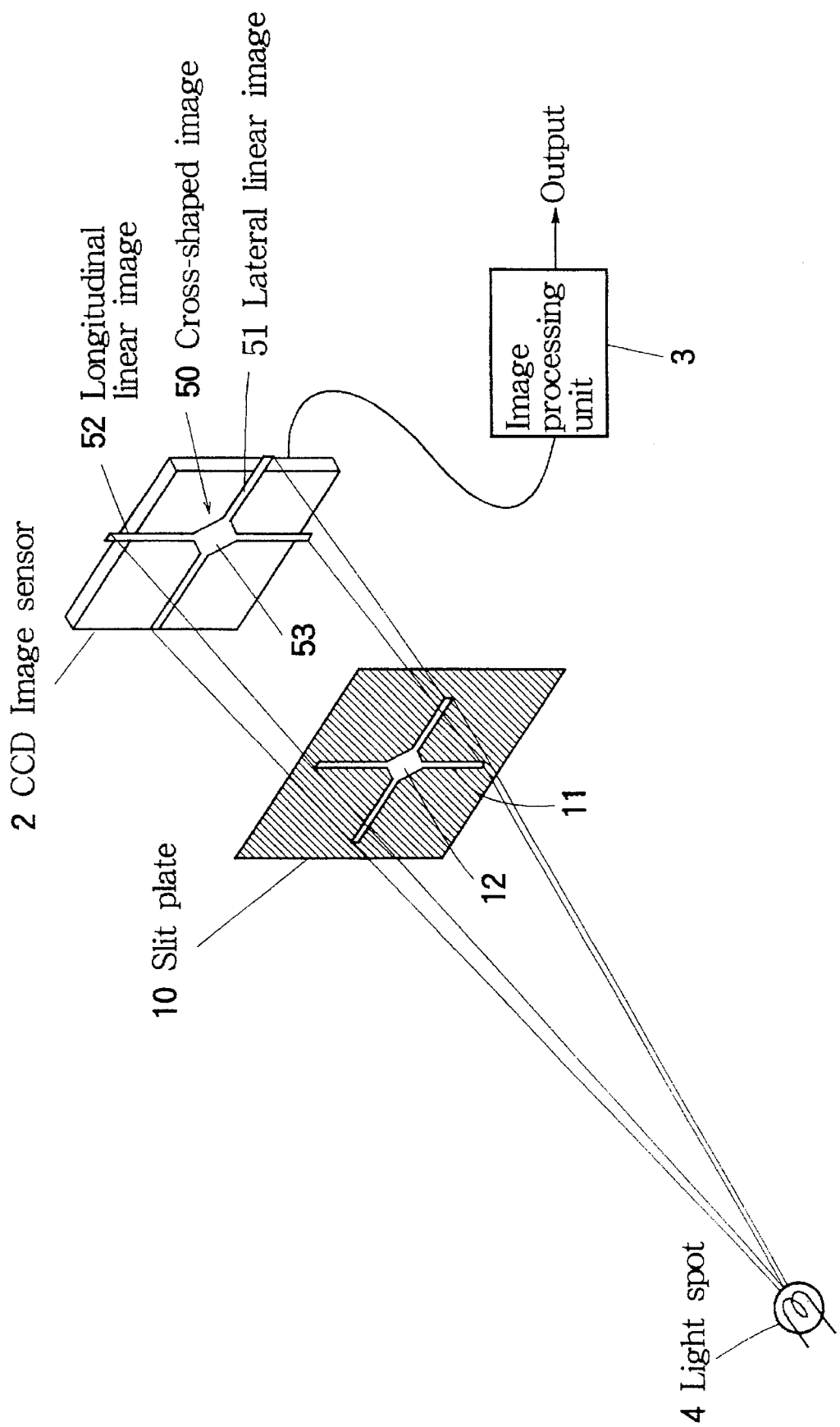
FIG. 8 is a diagram for explaining a light spot position measuring method according to a third preferred embodiment of the present invention.

FIG. 8 is a diagram for explaining a light spot position measuring method according to a third preferred embodiment of the present invention, wherein a two-dimensional position of the light spot is measured. A basic structure in FIG. 8 is the same as that shown in FIG. 1, and corresponding components are designated by corresponding reference numerals to facilitate the understanding of the structure shown in FIG. 8. In this preferred embodiment, a slit plate 10 is used as an optical converter to convert the light spot 4 as an object to be measured into a cross-shaped image 50 having a lateral linear image 51 and a longitudinal linear image 52 orthogonal to each other. The CCD image sensor 2 having the pixel array captures the cross-shaped image 50 and produces corresponding pixel data. The image processing or computing unit 3 processes the pixel data and derives a two-dimensional position of the light spot 4. The slit plate 10 is formed with a pair of slits 11 orthogonal to each other and a rhombic window 12 at an intersection of the slits 11. Corresponding to the rhombic window 12, a rhombic mark 53 is included in the cross-shaped image 50 at the center thereof and used for recognizing the cross-shaped image 50. By using the slit plate instead of the cylindrical lens as the optical converter, the spherical aberration or the like can be eliminated. On the other hand, the slit plate intercepts most of an incident light beam so that a brightness of the cross-shaped image 50 is not so high.

Figures 9, 10:
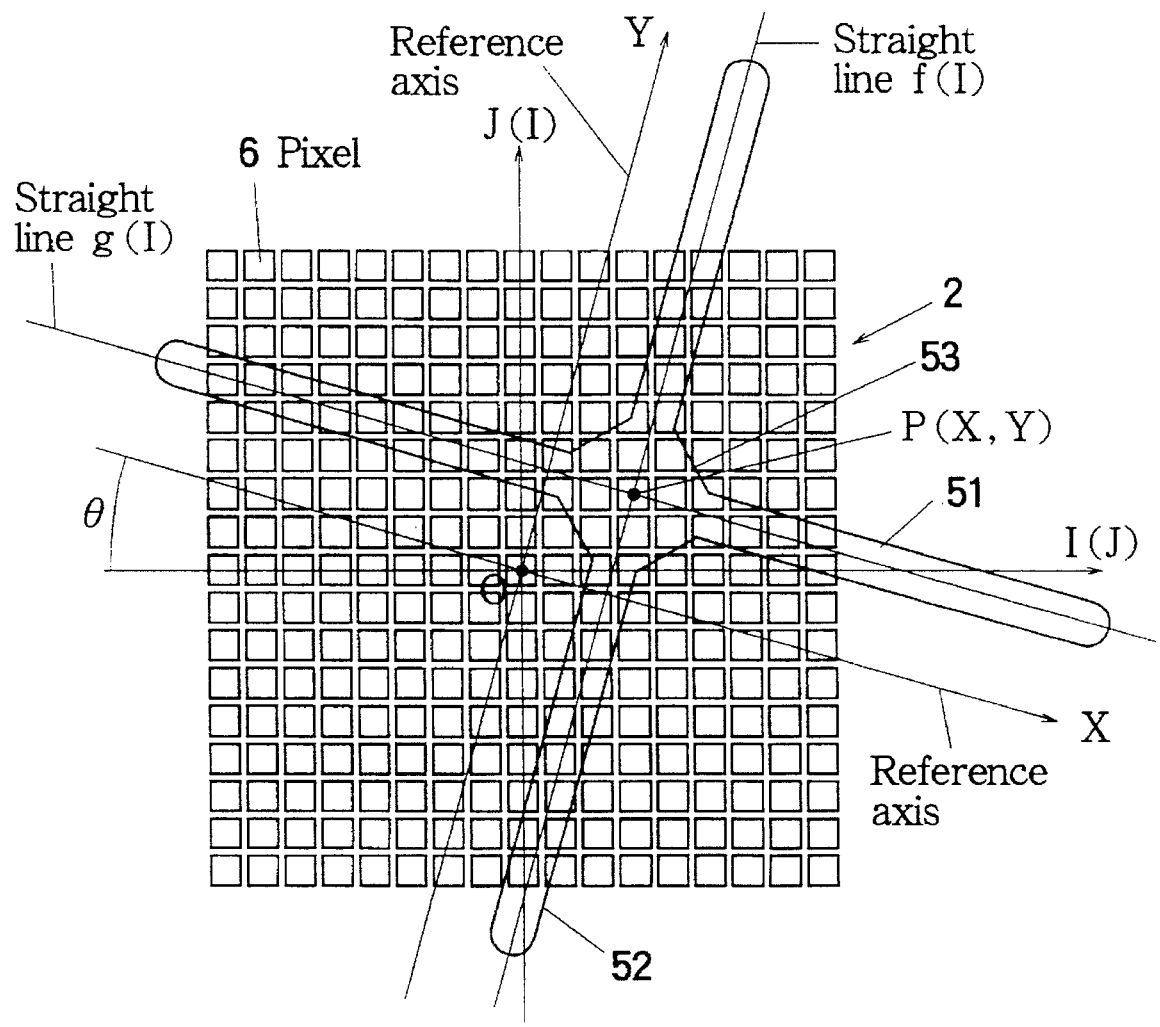
FIG. 9 is an enlarged plan view of a CCD image sensor shown in FIG. 8.
FIG. 10 is a diagram for explaining a rhombic operator used for effecting recognition of a cross-shaped image.

FIG. 9 is an enlarged plan view of the CCD image sensor 2 shown in FIG. 8. As shown in FIG. 9, an orthogonal coordinate system is set so as to match a desired matrix direction which the matrix array of the pixels 6 has. The orthogonal coordinate system is defined by the main axis (I) and the auxiliary axis (J). The cross-shaped image 50 is projected so as to be inclined relative to the orthogonal coordinate system by an angle θ deviating from 45°. As described above, the cross-shaped image 50 includes the lateral linear image 51, the longitudinal linear image 52 and the center rhombic mark 53. In this preferred embodiment, in order to determine the absolute two-dimensional position of the light spot 4, a pair of reference axes (X, Y) are used. This reference coordinate system has the origin which coincides with that of the orthogonal coordinate system and is parallel to the cross-shaped image 50. On the other hand, the present invention is not limited to the foregoing arrangement, but, the reference coordinate system and the orthogonal coordinate system may be arranged to coincide with each other completely. The pixel data outputted from the CCD image sensor 2 including the matrix array of the pixels 6 are processed by the image processing unit 3. Specifically, linear-approximation is effected to one of the linear images, an inclination of which is greater than 45° relative to the orthogonal coordinate system (I, J) (that is, the longitudinal linear image 52 in this preferred embodiment), so as to derive a center straight line f(I) thereof. Linear-approximation is further effected to the other of the linear images (that is, the lateral linear image 51 in this preferred embodiment), an inclination of which is greater than 45° relative to another orthogonal coordinate system derived by turning the initial orthogonal coordinate system in a counterclockwise direction by 90° from the initial position, so as to derive a center straight line g(I) thereof. Finally, based on results of the linear-approximations, the two-dimensional position of the light spot 4 corresponding to an intersection of the cross-shaped image is derived with high accuracy.

FIG. 10 is a diagram for explaining a rhombic operator to be used for effecting recognition of the cross-shaped image 50. As will be appreciated from FIG. 10, the rhombic operator is used for recognizing the rhombic mark 53 included in the cross-shaped image 50 at the center thereof.

With reference to the flowchart shown in FIG. 11, the procedure of the light spot position measuring method according to this preferred embodiment will be described in detail. First, at step S1, the rhombic operator shown in FIG. 10 is used to effect an integral calculation (dot products) relative to the pixel data. By deriving a distribution of peaks in the pixel data, all the projected cross-shaped images can be recognized and extracted. Each of the cross-shaped images is represented by Pk(Ik, Jk). Further, the following processes are effected to all of the cross-shaped images:

Specifically, at step S2, values of the pixel data outside a range defined between column numbers I=Ik−α and I=Ik+α are set to 0 (zero), wherein α is a preset integer for defining a window which matches the longitudinal linear image 52. Subsequently, the linear-approximation is effected using the method of least squares so as to derive the center straight line J=f(I) of the longitudinal linear image 52 in the same manner as in the flowchart shown in FIG. 5.

Subsequently, at step S3, values of the pixel data outside a range defined between row numbers J=Jk−α and J=Jk+α are set to 0 (zero). By this process, a window matching the lateral linear image 51 is set. Subsequently, the main axis (I) and the auxiliary axis (J) are exchanged therebetween (that is the orthogonal coordinate system is turned by 90°). Then, in the same manner as step S2, the linear-approximation is effected using the method of least squares so as to derive the center straight line J=g(I) of the lateral linear image 51. Finally, at step S4, an intersection point (II, JJ) between the straight lines f(I) and g(I) is derived. Coordinate transformation is effected to derive coordinates P (X, Y) in the reference coordinate system. Specifically, X=IIcosθ and Y=JJcosθ. As will be appreciated from the foregoing description, in this preferred embodiment, a pair of the orthogonal coordinate systems having the common origin and turned by 90° relative to each other are used. The longitudinal and lateral linear images are projected so as to be inclined relative to the orthogonal coordinate systems, and are subject to the linear approximations, respectively. The enlarged detection results by the magnified scale are obtained based on the straight lines derived by the linear approximations. The two-dimensional position of the light spot is derived based on the enlarged detection results.

Figure 12:
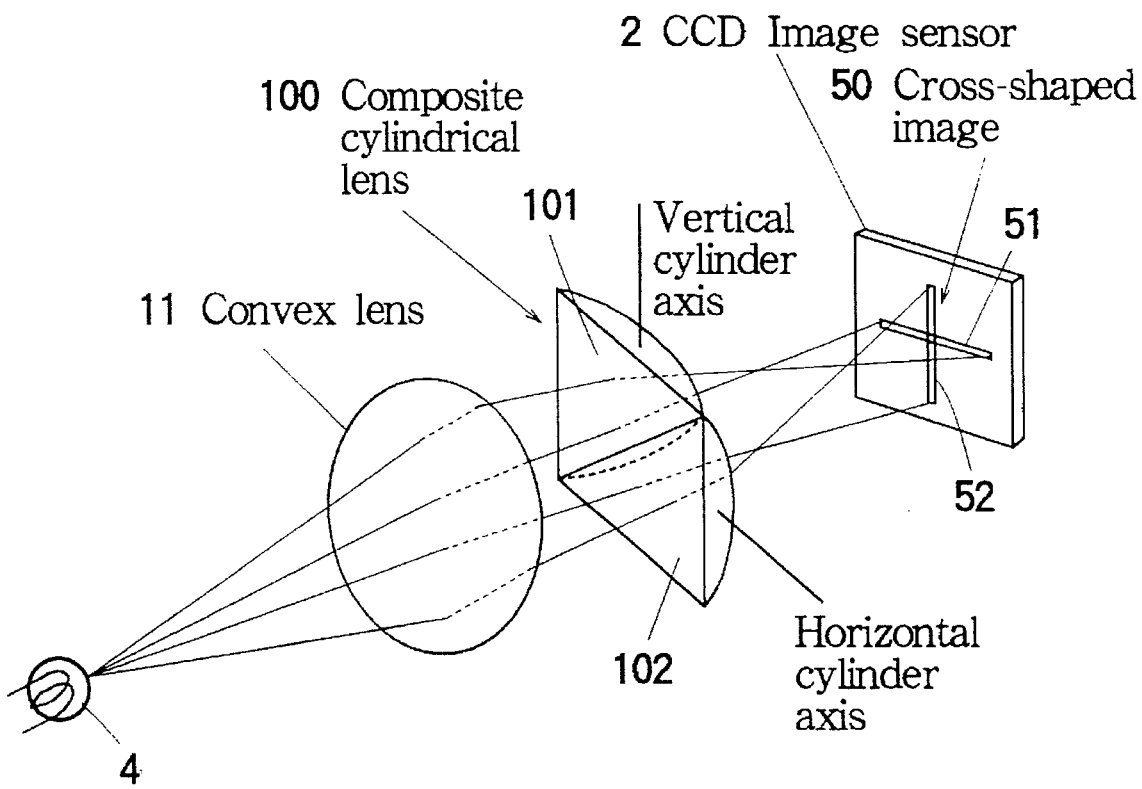
FIG. 12 is a diagram for explaining a light spot position measuring method according to a fourth preferred embodiment of the present invention.

FIG. 12 is a diagram for explaining a light spot position measuring method according to a fourth preferred embodiment of the present invention. Similar to the third preferred embodiment, a two-dimensional position of the light spot 4 is measured in this preferred embodiment. What differs from the third preferred embodiment is that a combination of a convex lens 11 and a composite cylindrical lens 100 is used instead of the slit plate 10 as an optical converter. The convex lens 11 condenses the light spot 4 onto the pixel array of the CCD image sensor 2. On the other hand, the composite cylindrical lens 100 includes divided cylindrical lens surfaces 101 and 102 which have their cylinder axes orthogonal to each other. The divided cylindrical lens surface 101 has the cylinder axis which is vertical, and defocuses the condensed light from the convex lens 11 in the horizontal direction for conversion into the lateral linear image 51. The other divided cylindrical lens surface 102 has the cylinder axis which is horizontal, and defocuses the condensed light from the convex lens 11 in the vertical direction for conversion into the longitudinal linear image 52. As a result, the cross-shaped image 50 having the longitudinal and lateral linear images 52 and 51 orthogonal to each other is formed on the CCD image sensor 2. By using the composite or compound cylindrical lens 100, the cross-shaped image which is sharp and high in brightness can be obtained.

Figure 13:
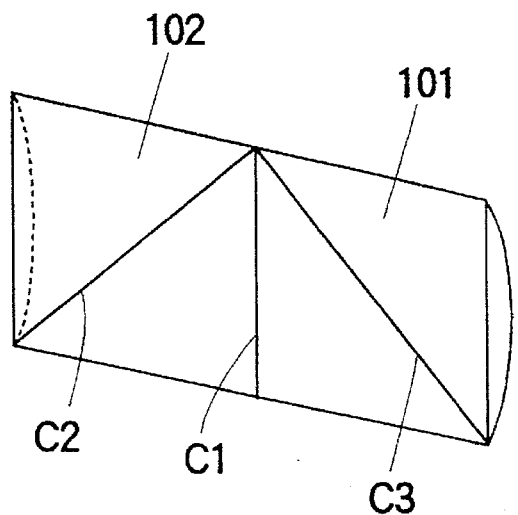
FIG. 13 is a diagram for explaining one example of producing a composite cylindrical lens shown in FIG. 12.

FIG. 13 is a diagram for explaining one example of producing the compound cylindrical lens 100 shown in FIG. 12. As shown in FIG. 13, an elongate rectangular cylindrical lens is first cut in half along a cut line C1. One of the cut lenses is further cut obliquely along a cut line C2 to obtain the cylindrical lens surface 102 shown in FIG. 12. The other of the cut lenses is also further cut obliquely along a cut line C3 to obtain the cylindrical lens surface 101 shown in FIG. 12.

As will be appreciated, according to the foregoing preferred embodiments, the light spot is converted into the linear image and projected onto the two-dimensional image pickup device. By setting the inclination of the linear image to equal to or greater than 65° relative to the horizontal axis of the two-dimensional image pickup device, a displacement of the light spot in the horizontal direction causes a magnified displacement in the vertical direction which is double the horizontal displacement or greater. Accordingly, the one-dimensional position of the light spot can be measured with high accuracy. By optimizing the inclined projecting direction of the linear image and the pixel matrix direction of the two-dimensional image pickup device, the one-dimensional position detecting resolution can be enhanced to such an extent as to correspond to the total number of the pixels included in the two-dimensional image pickup device. Further important effects are that, by converting the light spot into the cross-shaped image and projecting it onto the image pickup surface at the inclination angle deviating from 45°, even in the two-dimensional position detection, the one-dimensional position detecting resolution in the direction of each coordinate axis can be enhanced to such an extent as to correspond to the total number of the pixels included in the two-dimensional image pickup device. Further, by using the optical converter having a pair of the cylindrical lens surfaces for converting the light spot into the cross-shaped image, the sharp cross-shaped image with high brightness can be formed so that the merit of the light spot position measuring method according to the present invention can be derived to the maximum extent. Alternatively, by using the slit plate having a pair of the slits orthogonal to each other, the lens aberration can be eliminated to increase the measurement accuracy, and it is further possible to contribute to reduction in cost of the components.

It is to be understood that this invention is not to be limited to the preferred embodiments and modifications described above, and that various changes and modifications may be made without departing from the spirit and scope of the invention as defined in the appended claims.

What is claimed is:

1. A light spot position measuring method using an optical converter which converts a light spot of an object to be measured into a linear image extending substantially in a predetermined one-dimensional direction, using a two-dimensional image pickup device having a two-dimensional pixel array which captures said linear image to produce corresponding pixel data, and using an image processing unit which processes said pixel data to derive a position of said light spot along said one-dimensional direction, said method comprising:

a setting step for setting an orthogonal coordinate system relative to said pixel array, said orthogonal coordinate system having a main axis and an auxiliary axis, each of which is orthogonal to the other;

a projecting step for projecting the light spot onto the optical converter to convert the light spot into a linear image extending substantially in the predetermined one-dimensional direction and projecting said linear image onto the two-dimensional pixel array of the image pickup device so as to be inclined relative to said orthogonal coordinate system such that an angle of said linear image relative to said auxiliary axis is set smaller than that relative to said main axis;

a detecting step for processing said pixel data to effect linear-approximation of said linear image to derive a corresponding straight line and for detecting a one-dimensional position of said straight line in a direction of said main axis in terms of another one-dimensional position in a direction of said auxiliary axis by a magnified scale; and a deriving step for deriving the position of said light spot based on a result of said detection of the one-dimensional position of said straight line.

2. A light spot position measuring method as set forth in claim 1; wherein said projecting step includes projecting said linear image at an angle with respect to said auxiliary axis in a range between 0° and 25°.

3. A light spot position measuring method as set forth in claim 1; wherein said projecting step includes projecting said linear image using an optical converter comprising a cylindrical lens.

4. A light spot position measuring method as set forth in claim 1; wherein said projecting step includes projecting said linear image using an optical converter having a slit.

5. A light spot position measuring method as set forth in claim 1; wherein said deriving step includes deriving a one-dimensional position of said light spot along said main axis.

6. A light spot position measuring method as set forth in claim 1; wherein said deriving step includes deriving a one-dimensional position of said light spot along a predetermined reference axis other than said main axis.

7. A light spot position measuring method as set forth in claim 1; wherein said deriving step includes deriving a one-dimensional position of said light spot along a predetermined reference axis orthogonal to the straight line corresponding to the linear image.

8. A light spot position measuring method as set forth in claim 1; wherein said setting step includes setting a pair of orthogonal coordinate systems having a common origin and turned by 90° relative to each other, said projecting step includes projecting a pair of linear images so as to be inclined relative to said orthogonal coordinate systems, respectively, and said deriving step includes deriving a two-dimensional position of said light spot based on the pair of linear images.

9. A light spot position measuring method using an optical converter which converts a light spot of an object to be measured into linear images intersecting orthogonal to each other, using a two-dimensional image pickup device having a pixel array which captures said orthogonal linear images to produce corresponding pixel data, and using an image processing unit which processes said pixel data to derive a two-dimensional position of said light spot, said method comprising:

a setting step for setting an orthogonal coordinate system so as to match a desired lattice of said pixel array;

a projecting step for projecting the light spot onto the optical converter to convert the light spot into intersecting linear images which are orthogonal with respect to each other and projecting said orthogonal linear images so as to be inclined relative to said orthogonal coordinate system at an angle deviating from 45°; and a deriving step for processing said pixel data to effect linear-approximation of one of said orthogonal linear images, said one of the orthogonal linear images having an inclination greater than 45° relative to said orthogonal coordinate system, effecting linear-approximation of the other of said orthogonal linear images, said other of the orthogonal linear images having an inclination greater than 45° relative to another orthogonal coordinate system derived by turning said orthogonal coordinate system by 90°, and deriving the two-dimensional position of said light spot based on results of said linear-approximations, said two-dimensional position corresponding to an intersection of said orthogonal linear images.

10. A light spot position measuring method as set forth in claim 9; wherein said projecting step includes projecting the orthogonal linear images using an optical converter having divided cylindrical lens surfaces, said cylindrical lens surfaces having their cylinder axes orthogonal to each other.

11. A light spot position measuring method as set forth in claim 9; wherein said projecting step includes projecting the orthogonal linear images using an optical converter having slits arranged orthogonal to each other.

12. A light spot position measuring apparatus comprising: an optical converter for converting a light spot into a linear image and projecting the linear image; a two-dimensional image pickup device having a two-dimensional pixel array for receiving the projected linear image and producing corresponding pixel data, the pixel array being set with an orthogonal coordinate system having an orthogonal pair consisting of a main axis and an auxiliary axis such that an angle of the projected linear image relative to the auxiliary axis is set smaller than that relative to the main axis; and an image processing unit for processing the pixel data to effect linear-approximation of the linear image to derive a corresponding straight line, and for computing a first intercept of the straight line at the main axis by a magnified scale in terms of a second intercept of the same straight line at the auxiliary axis so as to determine a one-dimensional position of the light spot correlated to the first intercept.

13. A method for determining the position of a light spot, comprising the steps of:

converting a light spot into a linear image using an optical converter;

providing an image pick-up device having a two-dimensional pixel array for receiving an image and producing corresponding pixel data;

setting up an orthogonal coordinate system relative to the pixel array, the coordinate system having a main axis and an auxiliary axis orthogonal thereto;

projecting the linear image onto the pixel array so as to be inclined with respect to the orthogonal coordinate system such that an angle of the linear image with respect to the auxiliary axis is smaller than an angle of the linear image with respect to the main axis;

processing the pixel data output by the pixel array in response to the projected linear image to perform linear approximation to determine a straight line corresponding to the linear image, and determining the position of the straight line with respect to the orthogonal coordinate system in accordance with an intercept of the straight line with the main axis and an intercept of the straight line with the auxiliary axis; and determining a location of the light spot on the straight line in accordance with the position of the straight line.

14. A method for determining the position of a light spot according to claim 13; wherein the step of projecting the linear image onto the pixel array comprises the step of projecting the linear image at an angle with respect to the auxiliary axis in the range of 0° and 25°.

15. A method for determining the position of a light spot according to claim 13; wherein the step of converting the light spot into a linear image includes using an optical converter comprising a cylindrical lens.

16. A method for determining the position of a light spot according to claim 13; wherein the step of converting the light spot into a linear image includes using an optical converter having a slit.

17. A method for determining the position of a light spot according to claim 13; wherein the step of determining a location of the light spot on the straight line includes determining a position of the light spot along the main axis based on the position of the straight line.

18. A method for determining the position of a light spot according to claim 13; wherein the step of determining a location of the light spot on the straight line includes determining a position of the light spot along a predetermined reference axis other than the main axis based upon the position of the straight line.

19. A method for determining the position of a light spot according to claim 13; wherein the step of determining a location of the light spot on the straight line includes determining a position of the light spot along a predetermined reference axis orthogonal to the straight line corresponding to the linear image based on the position of the straight line.

20. A method for determining the position of a light spot according to claim 13; wherein the step of setting up an orthogonal coordinate system includes setting up a pair of orthogonal coordinate systems having a common origin and offset by 90° with respect to each other, the step of projecting the linear image onto the pixel array includes projecting a pair of linear images so as to be inclined with respect to the orthogonal coordinate systems, respectively, and the step of determining the location of the light spot on the straight line includes determining a two-dimensional position of the light spot based on the pair of linear images.

21. A method for determining the position of a light spot according to claim 20; wherein the step of projecting the pair of linear images is performed using an optical converter having divided cylindrical lens surfaces, the cylindrical lens surfaces having cylinder axes which are orthogonal to each other.

22. A method for determining the position of a light spot according to claim 20; wherein the step of projecting the pair of linear images is performed using an optical converter having slits arranged orthogonal to each other.

23. An apparatus for determining the position of a light spot, comprising: an optical converter for converting a light spot into a linear image and projecting the linear image; an image pickup device having a two-dimensional pixel array for receiving the projected linear image and producing corresponding pixel data, the pixel array being set with an orthogonal coordinate system having a main axis and an auxiliary axis orthogonal with respect thereto such that an angle of the projected linear image with respect to the auxiliary axis is smaller than an angle of the projected linear image with respect to the main axis; and image processing means for processing the pixel data by performing a linear-approximation of the linear image to derive a corresponding straight line and for computing a first intercept of the straight line at the main axis by a magnified scale in terms of a second intercept of the same straight line at the auxiliary axis so as to determine a one-dimensional position of the light spot correlated to the first intercept.

* * * * *